(12) United States Patent
Carpenter et al.

(10) Patent No.: US 7,286,480 B2
(45) Date of Patent: Oct. 23, 2007

(54) METHOD AND SYSTEM FOR DESIGN AND ROUTING IN TRANSPARENT OPTICAL NETWORKS

(75) Inventors: Tamra Carpenter, Skillman, NJ (US);
David Shallcross, Randolph, NJ (US);
Joel Gannett, Atlantic Highlands, NJ (US); Janet Jackel, Holmdel, NJ (US);
Ann Von Lehmen, Little Silver, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 870 days.

(21) Appl. No.: 10/768,911

(22) Filed: Jan. 30, 2004

(65) Prior Publication Data

US 2005/0169196 A1 Aug. 4, 2005

(51) Int. Cl.
*H04L 12/26* (2006.01)
*H04L 12/28* (2006.01)
*H04J 14/08* (2006.01)
*G06F 15/177* (2006.01)

(52) U.S. Cl. ............... 370/238; 370/255; 709/220; 398/97

(58) Field of Classification Search ............... 370/238, 370/254–256, 351; 709/220, 221, 238–242; 398/37, 97, 175
See application file for complete search history.

(56) References Cited

U.S. PATENT DOCUMENTS 5,724,659 A * 3/1998 Daniel et al. ............ 455/452.2

(Continued)

OTHER PUBLICATIONS

Bharat Doshi, et al. "Generic Optimizations for Transparent Optical Networks: The LightPath Intelligent Instantiator LIPI", Technical Proceedings of the National Fiber Optic Engineers Conference, pp. 47-55, Sep. 15-19, 2002.

(Continued)

*Primary Examiner*—Wing Chan
*Assistant Examiner*—Hong Sol Cho
(74) *Attorney, Agent, or Firm*—Joseph Giordano

(57) ABSTRACT

The present invention relates to a method and system for design and routing in telecommunications networks having transparent elements such as photonic switches. Transparent optical networks transmit signals optically, performing both switching and amplification photonically. As a result, transparent networks may be more economical than conventional "opaque" optical networks that convert signals to electronic form at each network node because they do not require as much equipment for performing optical-electrical conversion. However, transparent networks pose new operational challenges. Physical-layer impairments that are repaired by optical-electrical-optical (OEO) regeneration can accumulate along (transparent) connection paths. To effectively deploy and utilize transparency, mechanisms to assure that impairment-feasible paths exist and can be identified in the network are required. The present invention provides: 1) a method for locating OEO-regeneration capability to assure the existence of impairment-feasible paths in a network and 2) a method for identifying impairment-feasible connection paths in a network of transparent and OEO-capable nodes. The first is a method related to network design, which models the design problem as a variation of a connected dominating set problem. The second is a method related to network routing, which transforms the impairment-aware routing problem into a shortest-path problem in an expanded network. The design methodology of the present invention employs both domination and connectability concepts to enable sparser placement of OEO regeneration capability within networks. Further, the routing methodology of the present invention provides a mechanism for finding feasible routes with respect to impairment constraints while minimizing the use of OEO interfaces to assure such feasibility.

11 Claims, 5 Drawing Sheets

U.S. PATENT DOCUMENTS

| | | | |
|---|---|---|---|
| 6,260,072 | B1* | 7/2001 | Rodriguez-Moral ........ 709/241 |
| 6,870,813 | B1* | 3/2005 | Raza et al. ................. 370/238 |
| 7,171,124 | B2* | 1/2007 | Smith et al. .................. 398/97 |
| 2002/0141351 | A1* | 10/2002 | Maltz et al. ................ 370/254 |
| 2003/0035166 | A1* | 2/2003 | Zhang et al. ............... 359/118 |
| 2003/0227924 | A1* | 12/2003 | Kodialam et al. ..... 370/395.21 |
| 2004/0109407 | A1* | 6/2004 | Grover et al. .............. 370/218 |

OTHER PUBLICATIONS

M. Farahmand, et al. "Characterization and Representation of Impairments for Routing and Path Control in All-Optical Networks", Technical Proceedings of the National Fiber Optic Engineer Conference, pp. 279-289, Sep. 15-19, 2002.

G. Shen, et al. "Sparse Placement of Electronic Switching Nodes for Low Blocking in Translucent Optical Networks", Journal of Optical Networking, vol. 1, No. 12, pp. 424-441 Dec. 2002.

W. Van Parys, et al. "Evolution Towards Transparent Optical Networks Using Selective Wavelength Regeneration and Conversion", Technical Proceedings of the National Fiber Optic Engineer's Conference, pp. 1012-1017, Jul. 8-12, 2001.

X. Yang, et al. "Dynamic Routing in Translucent WDM Optical Networks", Proceeding of IEEE ICC 2002, New York City, pp. 1-9, 2002.

X. Yang, et al. "Sparse Regeneration in a Translucent WDM Optical Network", Proceedings of the Asia Pacific Optical and Wireless Communications Conference (APOC), pp. 1-10, 2001.

T. J. Carpenter, et al. "Impairment-Aware Design & Routing for Transparent Optical Networks", Proceedings of the National Fiber Optics Engineers Conference, pp. 1093-1102, 2003.

T. J. Carpenter, et al. "Cost-Conscious Impairment-Aware Routing", Technical Proceedings of the Optical Fiber Communication Conference, pp. 1-3, Mar. 2004.

S. Guha, et al. "Approximation Algorithms for Connected Dominating Sets", Algorithmica 20, 374-387; 1998.

T. Carpenter, et al. "Maximizing the Transparency Advantage in Optical Networks", Technical Proceedings of the Optical Fiber Communication Conference, vol. 2 pp. 616-617, 2003.

* cited by examiner d = dominated
u = undominated c = connected

○ Transparent node
◉ OEO-capable node

METHOD AND SYSTEM FOR DESIGN AND ROUTING IN TRANSPARENT OPTICAL NETWORKS

FIELD OF THE INVENTION

The present invention relates to a method and system for design and routing in telecommunications networks having transparent elements such as photonic switches. Transparent optical networks transmit signals optically, performing both switching and amplification photonically. As a result, transparent networks may be more economical than conventional "opaque" optical networks that convert signals to electronic form at each network node because the transparent networks do not require as much equipment for performing optical-electrical conversion. However, transparent networks pose new operational challenges. Physical-layer impairments that are repaired by optical-electrical-optical (OEO) regeneration can accumulate along transparent connection paths. To effectively deploy and utilize transparency, mechanisms to assure that impairment-feasible paths exist and can be identified in the network are required. The present invention provides: 1) a method for locating OEO-regeneration capability to assure the existence of impairment-feasible paths in a network and 2) a method for identifying impairment-feasible connection paths in a network of transparent and OEO-capable nodes. The first method is one of network design, which models the design problem as a variation of a connected dominating set problem. The design methodology of the present invention employs both domination and connectability concepts to enable sparser placement of OEO regeneration capability within networks. The second method provides for network routing by transforming the impairment-aware routing problem into a shortest-path problem in an expanded network. The routing methodology of the present invention provides a mechanism for finding feasible routes with respect to impairment constraints while minimizing the use of OEO interfaces to assure such feasibility.

BACKGROUND

All-optical transport offers significant advantages to carrier networks, including protocol and format independence and substantial cost savings from reduced numbers of OEO interfaces. However, routing in large-scale transparent networks, which may include many transparent network elements and/or long distances is problematic because of optical signal impairment accumulation along end-to-end routes. OEO conversion repairs these impairments but is expensive. In networks with transparent elements, especially large ones, it is difficult to locate OEO resources and then configure the network to use them efficiently. To support networks with transparent elements, operations support systems must assure design of networks with impairment-feasible routes (also referred to as "feasible routes") and must be able to identify such feasible routes at the time of capacity activation.

A basic paradigm for network design and capacity activation in opaque networks, where OEO conversion occurs at each node, is illustrated in FIG. 1. This approach utilizes a Capacity Placement module that determines where to place equipment and capacity and how much to place. The input to the Capacity Placement module includes a network topology and a demand forecast, while the output is a high-level network design. Opaque networks are engineered link-by-link with OEO conversion at the nodes, ensuring that impairments do not accumulate across multiple links. Transparent network designs, however, must consider the effect of impairment accumulation across multiple links. FIG. 2 illustrates a possible updated approach for design and capacity activation in networks with transparent elements as more fully described below.

There are several known methods that apply constraints to limit impairments in an effort to assure the existence of impairment-feasible paths in optical network design. For example, Doshi et al, "Generic optimizations for transparent optical networks: the lightpath intelligent instantiator LIPI"; *Technical Proceedings of the National Fiber Optic Engineer's Conference*, pp. 47-55, Sep. 15-19, 2002, describes a method for modeling impairment along optical routes using a single distance-oriented metric and which locates regeneration along pre-selected routes. Farahmand et al "Characterization and representation of impairments for routing and path control in all-optical networks"; *Technical Proceedings of the National Fiber Optic Engineer's Conference*, pp. 279-289, Sep. 15-19, 2002, also discusses constraint mechanisms for limiting impairments along a path in a network with transparent elements. Further, Van Parys et al "Evolution towards transparent optical networks using selective wavelength regeneration and conversion"; *Technical Proceedings of the National Fiber Optic Engineer's Conference*, pp. 1012-1017, Jul. 8-12, 2001, describes a method wherein a distance constraint is imposed to limit the impairment along a transparent subpath. Similar constraints and a routing algorithm that constrains distance are also presented in Shen et al, "Sparse placement of electronic switching nodes for low blocking in translucent optical networks," *Journal of Optical Networking* 1, 424-441 (2002). However, the routing algorithm presented in Shen et al may fail to identify feasible paths that exist in the network. The routing method presented in Yang and Ramamurthy, "Dynamic routing in translucent WDM optical networks," *Proceedings of IEEE ICC* 2002, New York, N.Y., (2002) can also fail to identify existing feasible paths.

In general, the known methods for locating OEO capability operate by iteratively improving previously computed routes until they become feasible. Such methods could be used to assure feasibility between each pair of nodes by generating a path between each pair of nodes and then placing OEOs, as needed, along these paths to make them feasible. However, this typically results in placing more OEOs than are needed to assure the desired feasibility for the network. Methods of this type are presented, for example, in Shen et al and in Yang and Ramamurthy, "Sparse regeneration in a translucent WDM optical network," *Proceedings of the Asia Pacific Optical and Wireless Communications Conference (APOC)*, C. Qiao and S. Xie, (eds.), Proc. SPIE 4585, (2001).

As further shown in FIG. 1, once the network is constructed, a separate operations support system typically handles capacity provisioning for setting up connections on request. The inputs to such a system are a network design (for example, a network design generated by the Capacity Placement module) and a sequence of client connection requests. The output is either a route and wavelength assignment for each request or a notification that the connection cannot be satisfied.

There remains a need in the art for improvements in the technology of design and routing of optical networks that contain transparent elements.

SUMMARY

The present invention provides a system and method for improving the efficiency of design and configuration of optical networks. The present invention provides: 1) a method for locating OEO-regeneration capability to assure the existence of impairment-feasible paths in a network and 2) a method for identifying impairment-feasible connection paths in a network of transparent and OEO-capable nodes. The design method of the present invention constructs graph models whose links represent feasible transparent connections and then adapts connectability and domination concepts to identify significantly sparser placement of OEO capability than required by prior art methods. The routing method transforms the impairment-aware routing problem into a shortest-path routing problem in an expanded network. Further, the routing method of the present invention provides a mechanism for finding feasible routes with respect to impairment constraints while minimizing the use of OEO interfaces to assure such feasibility. One improvement in the method of the present invention is that an impairment-feasible path will always be found as long as sufficient regeneration capacity exists in the network.

BRIEF DESCRIPTION OF THE DRAWINGS

FIG. 3b illustrates the domination graph for the network of FIG. 3a.

FIG. 3c illustrates the connectability graph for the network of FIG. 3a.

FIG. 4b illustrates a dominating set for the network of FIG. 4a.

FIG. 4c illustrates a connected dominating set for the network of FIG. 4a.

FIG. 6b illustrates the construction of an impairment graph for the network shown in FIG. 6a.

DETAILED DESCRIPTION OF THE DRAWINGS

The present invention relates to methodology for design and routing in telecommunications networks having transparent elements. The method of the present invention employs the idea of connected dominating sets and adapts domination and connectability concepts to enable more cost-effective placement of OEO-capable nodes within networks. The method and system of the present invention are advantageous because they are not limited to mitigation of impairment along pre-selected routes. The present invention does not rely on pre-selected routes to determine where to place OEOs in order to assure feasibility. Further, the present invention provides a routing scheme for configuring feasible routes with respect to impairment constraints and OEO capability. The routing method can be employed to locate OEO interfaces at OEO-capable nodes to minimize the cost of such interfaces.

Figure 1:
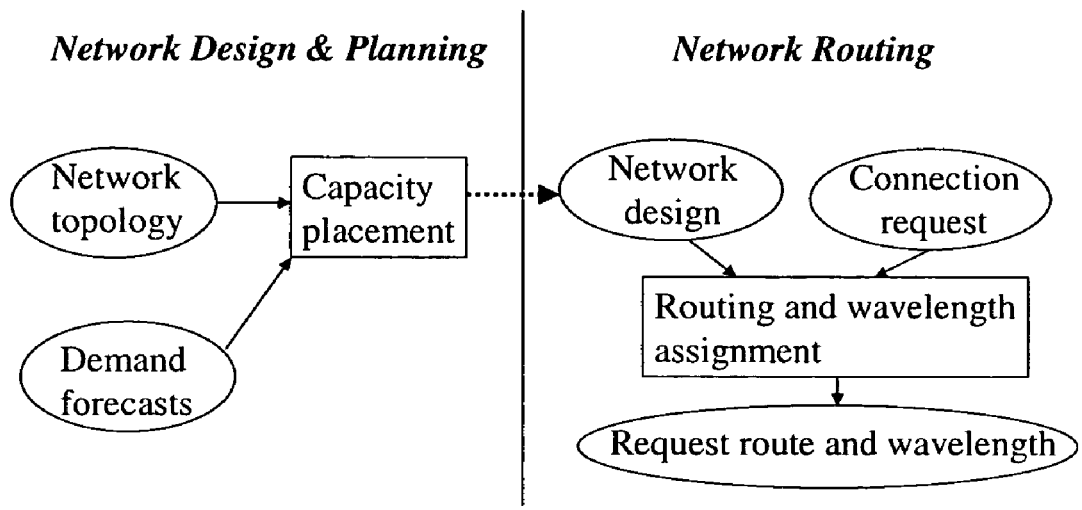
FIG. 1 illustrates a prior art approach to network design and capacity activation.
Figure 2:
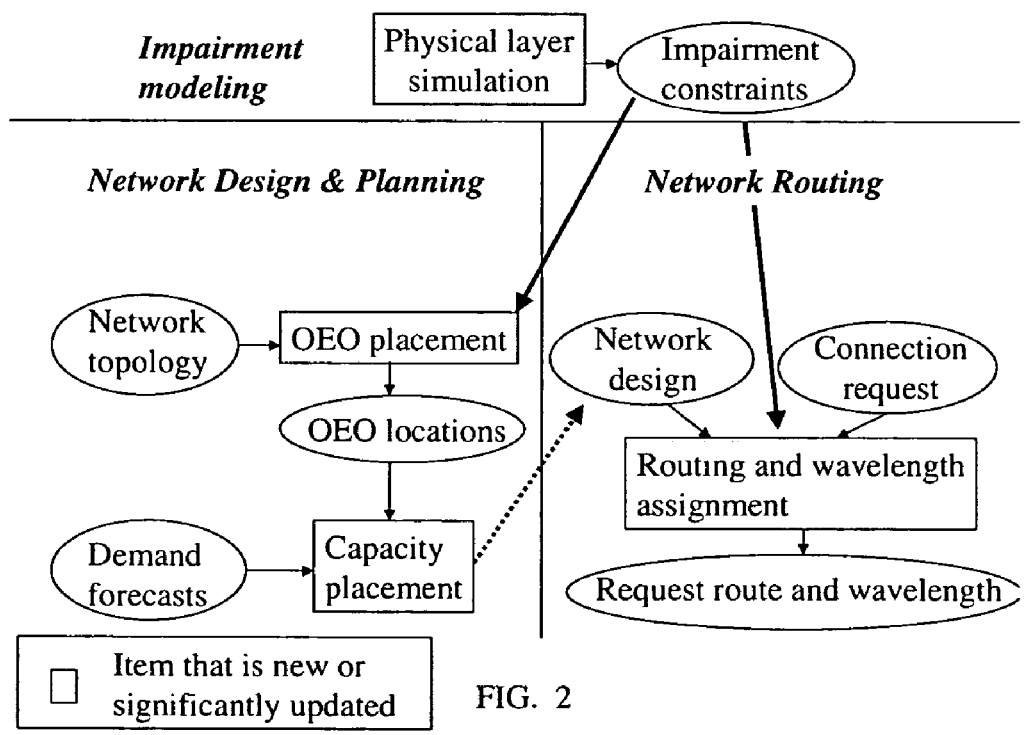
FIG. 2 illustrates an augmented impairment-aware design and capacity activation approach according to the present invention.

When networks include transparent elements, the basic functionality shown in FIG. 1 needs to be augmented with new capabilities to assure feasible routes. This augmented functionality according to the present invention is illustrated in FIG. 2, wherein new components are added to the system, or existing components are modified, to address impairment feasibility. In particular, an impairment-modeling layer that translates physical-layer impairments into parameters for constraints that can be applied in design and routing is added to the process. These constraints are a surrogate for more detailed and accurate models of impairment accumulation along a path that are difficult to include in routing and design algorithms. These constraints can be abstracted from analytical models, simulations, or experiments that provide more detailed impairment assessment. (See, for example, Carpenter et al, "Cost-conscious impairment-aware routing," to appear in *Technical Proceedings of the Optical Fiber Communication Conference*, March, 2004). The present invention provides a method for locating OEO regeneration capability that assures the existence of at least one feasible path between each pair of nodes in the network, as long as sufficient capacity exists. A network design that provides at least one impairment-feasible path between each pair of nodes is referred to as a "feasible design". Such a design is robust in the face of dynamically changing demand patterns because it assures feasibility between all pairs of nodes. FIG. 2 includes a module for locating OEO capability in a network using network topology data and impairment-related metrics and constraints as input and providing locations selected to be OEO capable as output. The method of the present invention also identifies a feasible route with respect to impairment-related constraints whenever such a route exists. Using this method can also minimize the cost of OEO regeneration by identifying a least-cost impairment-feasible path. As shown in FIG. 2, the method of the present invention includes a routing and wavelength assignment module that has been modified to include such impairment-modeling capabilities. This modification is not found in the prior art approach represented by FIG. 1.

The impairment-modeling module as shown in FIG. 2 translates physical phenomena into simple metrics applied to nodes and links in a network model. The sum of these metrics along a transparent path or subpath represents impairment accumulation across the associated network elements and fiber spans traversed. Constraints on the maximum impairment accumulation along a path are used to enforce route feasibility. The method of the present invention allows several different metrics to be associated with each network element and allows multiple constraints to be applied simultaneously. A path is deemed feasible if all of its subpaths are simultaneously within the limit imposed for each metric. In general, the design and routing methodologies apply to non-negative metrics, and the constraints will be imposed on sums of metrics along a path or subpath.

However, constraints on the products of metrics may also be used as they can be represented as sums of logarithms. The present invention also allows a limit on a function of sums of individual metrics.

As an example, constraints on the physical distance and the number of consecutive transparent nodes between OEO regenerations can be imposed. Thus, distance is the metric applied to links and a counter is applied to transparent nodes. A path is deemed feasible if no segment (subpath) between consecutive OEO locations is either too long or crosses too many transparent nodes. In addition, constraint dependencies can be applied, for example, to allow traversal of longer distances when fewer transparent nodes are traversed.

As noted above, known methods for placing OEO capability operate by iteratively improving previously computed routes until they become feasible. Thus, by assuring that a specific path between each pair of nodes is feasible, the prior art methods assure the desired network-level feasibility. These prior art methods may be referred to as path-improvement heuristics. By tying feasibility to specific paths, as is done in the known methods (Shen et al and Yang and Ramamurthy [2001]), path-improvement heuristics typically place more OEOs than needed to assure the desired property.

The present invention employs an entirely different approach to assure that a feasible path exists between each pair of nodes. The method of the present invention is advantageous because it decouples design from routing to identify significantly fewer necessary OEO placements. In accordance with the present invention, the existence of at least one feasible path between every pair of nodes in the network is assured by meeting the following two general properties.

Property 1: Every transparent node can reach at least one OEO along a feasible path.

Property 2: Each pair of OEOs can communicate along a feasible path.

Figure 3A:
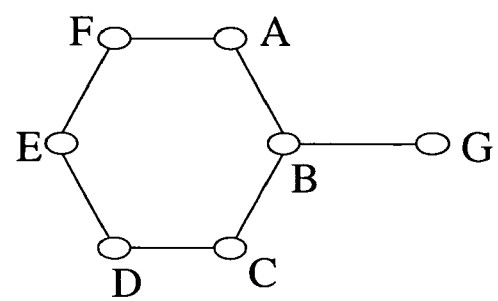
FIG. 3a illustrates a simple network comprised on nodes A through G.
Figure 3B:
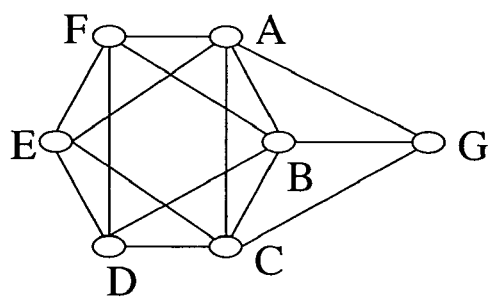
Figure 3C:
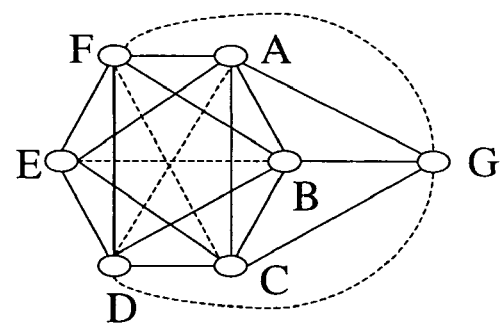

These two properties can be represented by two graphical models constructed from information about the original network. The first graph is called the domination graph and it has a node corresponding to every node in the original network, with a link between two nodes whenever the original network contains a feasible path between them when all nodes except one of the two endpoints is transparent. The second graph is called the connectability graph, and it has a node corresponding to every node in the original network, with a link between two nodes if the original network has a feasible path between them when both have OEO capability but all other nodes are transparent. Hence, the domination graph represents feasible communication between an OEO node and a transparent node without intermediate regeneration, while the connectability graph represents such communication between two OEO nodes. Since both graphs are on the same set of nodes, we refer to the links in the domination graph as the domination links and the links in the connectability graph as the connectability links. FIG. 3a shows a network having nodes labeled A through G. Assuming a feasibility constraint that allows crossing no more than two consecutive transparent nodes, FIG. 3b represents the domination graph for the network shown in FIG. 3a, while FIG. 3c represents the connectability graph for the network shown in FIG. 3a. Dashed-line links in FIG. 3c are connectability links that are not also domination links in the domination graph. The method of the present invention uses the domination graph to enforce Property 1 and the connectability graph to enforce Property 2.

Figure 4A:
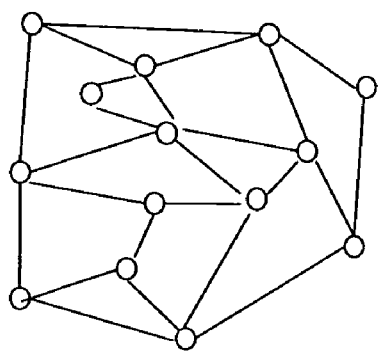
FIG. 4a illustrates a further simple network.
Figure 4B:
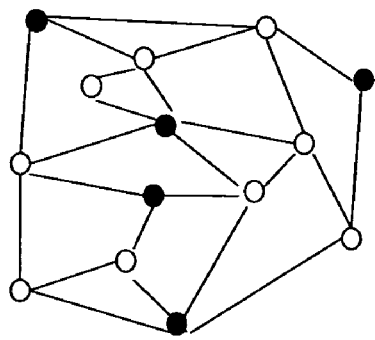
Figure 4C:
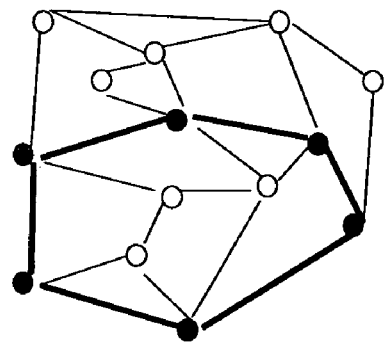

For any given graph, a dominating set is a subset S of the nodes of the graph such that every node not in S is adjacent (i.e. directly connected) to a node in S. A connected dominating set (CDS) is a dominating set S with the additional property that the nodes in S remain connected when all other nodes are removed from the graph. FIG. 4a shows a network comprised of fourteen nodes. FIG. 4b shows one example of a dominating set (that is not also a CDS) for the network of FIG. 4a, wherein the nodes in the dominating set are illustrated as darkened nodes. FIG. 4c provides one example of a connected dominating set for the network of FIG. 4a, wherein the nodes in the connected dominating set are again illustrated as darkened nodes. The problems of finding the smallest set of nodes S to provide either a dominating set or a connected dominating set are well-known problems in the literature. [See Garey et al, *Computers and Intractability*; W. H. Freeman and Company, 1979 and Guha and Khuller, "Approximation algorithms for connected dominating sets," *Algorithmica* 20, 374-387 (1998).] These problems are theoretically computationally intractable (NP-hard) as noted in the references, but heuristic and exact solution methods exist in the literature. (See, for example, Guha and Khuller.)

The method of the present invention describes how to model the OEO location problem as a variant of a connected dominating set problem in order to adapt and exploit known solution methods. In standard connected dominating set problems, connectability and domination are represented on the same graph. However, in accordance with the present invention, a connectability graph representing communication between two dominating set (i.e. OEO) nodes is also used to allow modeling altered capabilities of the nodes of the dominating set more precisely. Four different cases may be considered.

Case 1: The connectability and domination graphs have the same set of links and are therefore identical. This case corresponds to the situation in which making two nodes OEO-capable does not significantly alter their ability to communicate without intermediate regeneration relative to the case when only one of the two nodes is OEO-capable. Placing OEO capability at nodes corresponding to a connected dominating set in the domination graph (or the connectability graph since they are the same) assures both Property 1 and Property 2 so that the desired network-level feasibility will be met. Specifically, the existence of a feasible path between each pair of nodes given such OEO placements is assured because, as defined above, every node not in the dominating set is adjacent to a node in the dominating set. By definition of the domination graph, adjacent nodes have a feasible path without intermediate regeneration between them in the network. Thus, every transparent node can reach some OEO node. Further, since the nodes in the connected dominating set remain connected when all other nodes are removed, it is assured that OEO nodes can feasibly communicate with each other in the network.

Case 2: The links of the domination graph are a proper subset of those in the connectability graph. This corresponds to a case in which OEO capability enhances the ability of a node to communicate with other OEO nodes without intermediate regeneration. Placing OEO capability at nodes corresponding to a connected dominating set in the domination graph assures both Property 1 and Property 2 so that the desired network-level feasibility will be met. This allows direct use of standard methods for identifying a CDS, but may not fully exploit the enhanced capabilities of OEO nodes.

Case 3: The links of the connectability graph are a proper subset of those in the domination graph. This corresponds to a case in which OEO capability degrades the ability of a node to communicate with other OEO nodes without intermediate regeneration. Placing OEO capability at nodes corresponding to a connected dominating set in the connectability graph assures both Property 1 and Property 2 so that the desired network-level feasibility will be met. This allows direct use of standard methods for identifying a CDS, but may not take advantage of better communication between transparent and OEO nodes.

Case 4: The domination links neither contain nor are contained by the connectability links. This corresponds to a situation in which different pairs of nodes are affected differently by providing OEO capability at both nodes. In this case, placing OEO capability at nodes corresponding to a connected dominating set in either graph may not assure both Property 1 and Property 2.

As noted above, finding the smallest connected dominating set in a general graph is a well-known NP-hard problem in theoretical computer science. [See Garey et al, *Computers and Intractability*; W. H. Freeman and Company, 1979 and Guha and Khuller, "Approximation algorithms for connected dominating sets," Algorithmica 20, 374-387 (1998)]. Any heuristic or exact procedure for solving this problem can be used in the method of the present invention and applied to the domination graph for Cases 1 and 2, or to the connectability graph for Case 3, to find suitable OEO placement. Therefore, the method of the present invention defines and models the desired properties of the OEO location as a connected dominating set problem but is not tied to a specific method for solving such problems.

While OEO placements that assure feasible paths can be determined for Cases 2 and 3 using a single graph, using both the domination graph and the connectability graph allows more precise modeling of feasibility differences that arise when just one, versus both, of a pair of nodes are OEO-capable. This is because, as noted above, the domination graph represents feasibility when only one endpoint is an OEO, while the connectability graph represents feasibility when both endpoints are OEOs. By using both graphs, a more accurate representation of feasibility between nodes can be achieved than by using one graph alone. This results in the expansion of choices for OEO placement to produce better solutions. Moreover, by using both graphs, the desired properties can also be assured for Case 4.

For example, to expand choices when Case 2 applies, both graphs are used to find a dominating set in the domination graph that is a connected dominating set in the connectability graph. Such a set may not be a connected dominating set in the domination graph, but still corresponds to a set of nodes that guarantees both Property 1 and Property 2. It should be noted that an arbitrary connected dominating set in the connectability graph can fail to satisfy Property 1 and therefore, the domination graph is still necessary to assure that both Property 1 and Property 2 are met. To illustrate, consider the graphs in FIGS. 3*b* and 3*c* for which Case 2 applies. As shown in FIG. 3*c*, the node B is directly connected to all other nodes in this connectability graph, and therefore, the set containing node B is a connected dominating set in this graph. However, if an end-to-end connection can traverse at most two consecutive transparent nodes, then providing a single OEO location at node B is inadequate because node E cannot reach it. Thus, Property 1 does not hold. Because node B cannot reach node E, the set consisting of just node B is not a dominating set in the domination graph, FIG. 3*b*. This example shows that not every connected dominating set in the connectability graph assures the desired properties. However, a connected dominating set in the domination graph is sufficient, but not necessary, for assuring the desired properties when Case 2 applies. Thus, it is possible to assure both properties without providing a connected dominating set in the domination graph. For example, in FIGS. 3*b* and 3*c* the set {B, E} assures both properties but is not a connected dominating set in the domination graph. To satisfy both properties when Case 2 applies, it is necessary only to have a set of nodes that is both a dominating set in the domination graph and a connected dominating set in the connectability graph.

The method of the present invention can be used to find sets of nodes that constitute both a dominating set in the domination graph (assuring Property 1) and a set that remains connected in the connectability graph (assuring Property 2). By using both graphs, the method of the present invention assures Property 1 and Property 2 for all of the possible Cases 1-4. By monitoring the connectedness property in the connectability graph and domination in the domination graph, the minimum number of OEO locations required to guarantee the desired feasibility properties can be determined by an exact procedure. Alternatively, a simple greedy heuristic, presented in Guha and Khuller, can be modified to identify an approximate solution.

In particular this method of the present invention is performed as follows.

Create domination and connectability graphs associated with a given network (constructed on the same set of nodes).

Initially label each node in the domination graph with domination status "undominated" and in the connectability graph with connection status "unconnected".

Initialize the OEO list to be empty.

Assuming that a node dominates itself and any node that is adjacent to it, determine the number of nodes dominated by each node in the domination graph.

Select one node that dominates the most nodes in the domination graph.

Perform the following scanning operation on the selected node.

Scanning Operation:
a. Add the selected node to the OEO list.
b. Update the labels of the selected node to be "dominated" in the domination graph and "connected" in the connectability graph.
c. Update labels for all nodes connected to the selected node to be "dominated" in the domination graph and to be "connected" in the connectability graph.

Determine if any "undominated" nodes still exist, and while they exist, perform the scanning operation on the "connected" node that dominates the most "undominated" nodes.

When no "undominated" nodes remain, the nodes on the OEO list form a dominating set in the domination graph that remains connected when all other nodes are removed from the connectability graph. By providing OEO capability at the nodes that are on the OEO list a feasible path between every pair of nodes in the network is assured.

Figure 5A:
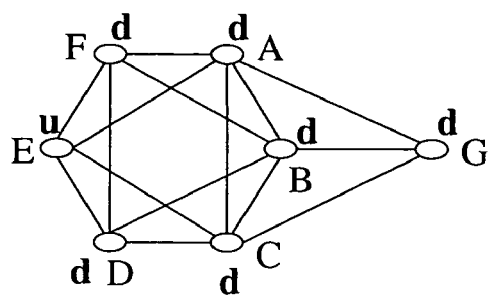
FIG. 5a illustrates node labels for the domination graph associated with the network shown in FIG. 3a after the scanning method according to the present invention has been performed on node B.
Figure 5B:
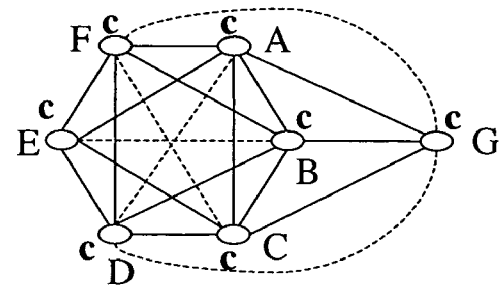
FIG. 5b illustrates node labels for the connectability graph associated with the network shown in FIG. 3a after the scanning method of the present invention has been performed on node B.

To illustrate, the method of the present invention is applied to the network of FIG. 3*a*. First the domination graph (FIG. 3*b*) and connectability graph (FIG. 3*c*) are created and each node in the domination graph is labeled "undominated", and each node in the connectability graph is labeled "unconnected". Further, the OEO list is initially set to be empty. The number of nodes dominated by each node is then determined. In this case, each of nodes A, B, and C dominates 6 nodes in the domination graph, nodes D, E, and F dominate 5 nodes in the domination graph and node G dominates 4 nodes in the domination graph. In accordance with the present invention, any of nodes A, B or C may be selected, as they each dominate the maximum number of nodes. For purposes of this example, node B was arbitrarily selected. The scanning operation is now performed as follows. Node B is added to the list of OEO locations and its labels are updated to be "dominated" in the domination graph and "connected" in the connectability graph. Next, the labels for all nodes connected to node B are updated to be "dominated" in the domination graph and to be "connected" in the connectability graph. In this case, all of the nodes except E are updated to be "dominated" in the domination graph and all of the nodes are updated to be "connected" in the connectability graph. FIG. 5a shows the results of this labeling for the domination graph, and FIG. 5b shows the results of this labeling for the connectability graph. It can then be determined that only node E remains "undominated". Nodes A, C, D, E, and F are "connected" nodes that dominate node E, hence any one of these might be chosen as they dominate the most "undominated" nodes. For the purposes of this example, node E is arbitrarily selected. The scanning process is then carried out on node E, resulting in the node E being added to the OEO location list and the node E label in the domination graph being updated to "dominated". At this point, no "undominated" nodes remain, and nodes B and E are chosen as OEO locations. The set of nodes {B, E} represents both a connected dominating set in the connectability graph and a dominating set in the domination graph, and therefore, providing OEO capability at these two nodes assures a feasible path between every pair of nodes in the network by satisfying both Property 1 and Property 2.

In summary the OEO placement method according to the present invention relies on both the domination graph and the connectability graph to reflect node pairs that can communicate, in an impairment-feasible manner, without intermediate regeneration. The domination graph represents pairs of nodes that can communicate when either one of them, but not both, has OEO capability; while the connectability graph represents nodes that can communicate when both have OEO capability. Impairment-feasibility may be determined by enforcing constraints, possibly based on features like node counts or distance. The connectability and domination graphs can be constructed from an input network topology using a constrained routing method to verify the existence of impairment-feasible paths without intermediate regeneration. For example, the routing method according to the present invention, as further described below, may be used. A network design tool utilizing both the domination graph and the connectability graph can assure the existence of feasible paths with respect to set network constraints, such as the number of intermediate nodes and distance noted above. By placing OEO capability at nodes that simultaneously correspond to a dominating set in the domination graph and a set that remains connected in the connectability graph, network feasibility is assured and may require fewer OEO locations than if only one graph is used. Therefore, the present invention may provide greater flexibility in the network design and may result in more efficient and cost-effective networks when nodes are either expensive OEO-capable nodes or cheaper transparent nodes.

Once a design method has been used to assure feasible routes, a routing algorithm in accordance with the present invention may be used to find the feasible routes. In order to assure identification of existing feasible routes, a routing algorithm must explicitly monitor and constrain impairments along paths and must account for the restorative effect of OEO nodes. In the method according to the present invention, constraints on impairment-related metrics, e.g. distance, number of intermediate nodes, etc., are enforced to limit impairment accumulation along paths and the restorative effect of OEO regeneration is explicitly modeled. To identify impairment-feasible paths, the network is transformed into an "impairment graph" wherein nodes in the original network are represented along with the possible impairments incurred to reach the node. Impairment-feasible paths in the network can be determined by solving a shortest-path problem in the impairment graph. The method of the present invention may be implemented either by building the complete impairment graph and then applying a standard shortest-path algorithm in the impairment graph, or by modifying a standard shortest-path algorithm to implicitly construct the impairment graph, instantiating a new node only when the impairment state is achieved along a route. Standard shortest-path algorithms that can be used in the method of the present invention include Bellman-Ford and Dijkstra's algorithms [see Ahuja et al, *Network Flows: Theory, Algorithms and Applications*, (Prentice-Hall, 1993), or Lawler, *Combinatorial optimization networks and matriods*, (Holt, Rinehart and Winston, 1976)].

The impairment-aware routing method of the present invention can be described as finding a minimum-cost path in a network that is expanded (either implicitly or explicitly) to reflect the possible impairment states achievable along a path between given endpoints. For example, consider the case where both the distance and the number of consecutive transparent nodes between OEOs on a path are constrained. An impairment graph can be constructed in which each node v is replaced with copies <v,i,d,in > and <v,i,d,out> for each distance d and transparent node count i such that a path of length d with i transparent nodes would be feasible without regeneration. On this impairment graph, a directed link is constructed from <v,i,d,out> to <w,i,d+l,in > if there is a link (v,w) of length l in the original network. Further, a directed link from <v,i,d,in > to <v,i+l,d,out> is constructed if it is permissible to pass through v transparently, and the link that is created is assigned the cost of such pass through. A directed link is also constructed from <v,i,d,in > to <v,0,0,out> and assigned the cost of regeneration if it is permitted to regenerate at v. If both options are allowed, then both links are constructed and a particular path's choice of link corresponds to a choice about regeneration. Directed paths in this graph will remain impairment-feasible. For a path traced from an initial node <s,0,0,in >, the values i and d correspond to the number of transparent nodes and the distance since the last regeneration. Feasibility is maintained by not constructing nodes with infeasible values. For this example, directed paths in this network must obey both the consecutive transparent node limit and the distance limit. When the node or distance limits would be exceeded by some move, then that move is forbidden because the link corresponding to the move and the node corresponding to the new state are excluded from the expanded network. Regenerating at an OEO node resets both the node and distance counters to 0. The running time of this routing algorithm depends on the distance limit in such a way that the algorithm is not polynomial-time, but appears practical for realistic network sizes.

Figure 6A:
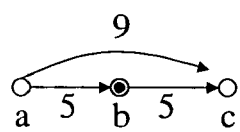
FIG. 6a illustrates a simple network.
Figure 6B:
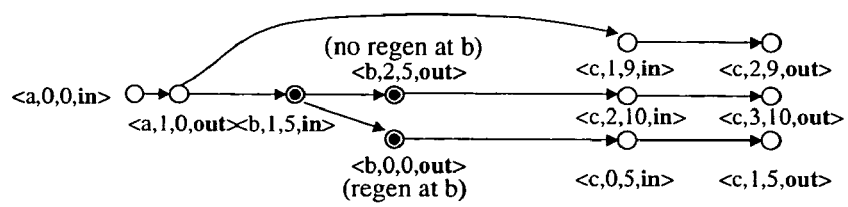

FIGS. 6a and 6b show an example of how the impairment graph is constructed in accordance with the present invention. FIG. 6a shows a graph for a simple network comprised of three nodes labeled a, b and c, and both the connection possibilities and the distances for such connections. FIG. 6b shows the impairment graph for finding an impairment-feasible path from node a in the network shown in FIG. 6a, where the transparent node limit has been constrained to be less than or equal to 3 and the distance limit has been constrained to be less than or equal to 10. In accordance with the routing method of the present invention, each node within the network is represented by a set of nodes representing both the node in the original network and a possible impairment state to reach that node. For example, node a in FIG. 6a becomes nodes <a,0,0,in > and <a,1,0,out> in FIG. 6b. A directed link is constructed between these two nodes to represent crossing it transparently and the transparent node counter is increased from 0 to 1. A directed link can be constructed between node <a,1,0,out> and node <c,1,9,in > since there is a direct link of distance 9 between nodes a and c in the network. Similarly paths through node b can be constructed. There are two separate paths through node b, based on the choice of whether or not to regenerate at OEO node b. It is noted that if all connections passing through node b are regenerated, then node <b,2,5,out> is not created. However, by including both nodes <b,2,5,out> and <b,0,0,out> the method of the present invention is adapted to make decisions on whether or not to regenerate at node b. The choice of whether or not to regenerate depends on the cost applied to each link from <b,1,5,in >. When the objective is to minimize the cost of regeneration, this cost should reflect the cost of providing regeneration when it is performed. The method of the present invention allows for minimizing OEO regenerations along a path or balancing the costs of adding new and using existing transponders in the network.

While the example above uses only two constraints, i.e. distance and number of transparent nodes between regenerations, the method of the present invention can be used more generally. Impairment accumulation along a path is represented by the sum of non-negative metrics associated with the elements and spans traversed. In particular, constraints on the maximum sum for impairment accumulation along a path can be set and then enforced to assure route feasibility. The method of the present invention allows several different metrics to be associated with each network element and allows multiple constraints to be applied simultaneously. A path is deemed feasible if each of its transparent subpaths is simultaneously within the limit imposed for each metric.

In summary, the routing model according to the present invention provides a very general and flexible approach to assuring feasibility and has the following key features. The present invention can use simple constraints, such as node counts or distance, to enforce the feasibility of paths in the network. The method of the present invention explicitly models the restorative effect of OEO conversion and provides the framework to embed a variety of path-feasibility constraints. In addition the method of the present invention can be used to select an impairment-feasible path that minimizes the number of OEO conversions (and hence the number of required transponders) or the cost of performing OEO conversion.

Figure 7A:
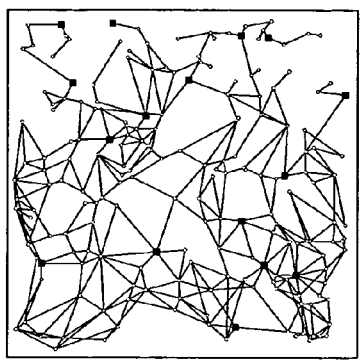
FIG. 7a shows OEO locations selected by the method of the present invention.
Figure 7B:
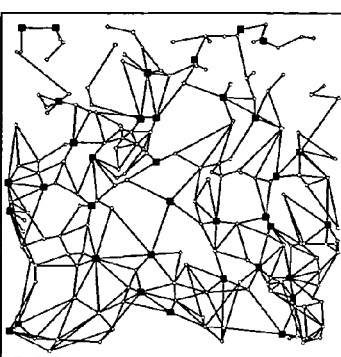
FIG. 7b shows OEO locations selected by a method according to the prior art.
Figure 7C:
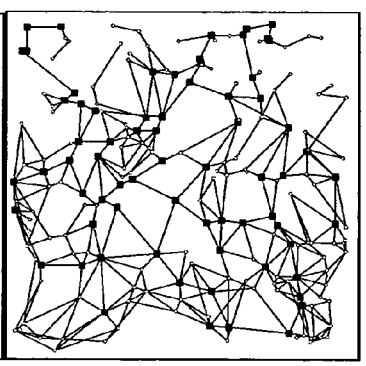
FIG. 7c shows OEO locations selected by another method according to the prior art.

To illustrate the effectiveness of the present invention, experiments were conducted on a 200-node network with randomly placed nodes and "LATA-like" connectivity mimicking that of real networks. FIG. 7 shows the general structure of this network. To determine placement of nodes in the network, three different methods were employed: the method according to the present invention and two path-improvement methods representing prior art. The results of an experiment based on constraints of no more than 3 consecutive transparent nodes or 80 km between regenerations are shown in FIGS. 7a, 7b and 7c, wherein OEO placements are represented by solid points. FIG. 7a shows the results of using the method of the present invention based on connectability and domination graphs. FIG. 7b shows the results of using the path-improvement placement method described in Carpenter et al, "Maximizing the transparency advantage in optical networks," *Technical Proceedings of the Optical Fiber Communication Conference*, Vol. 2, pp. 616-617, (2003). FIG. 7c shows the results of using a path-improvement method more similar to the prior art as described in Shen etal and Yang and Ramamurthy (2001). As is readily apparent from the results of this experiment, by using the methods of the present invention, significantly sparser OEO placement can be achieved than by using the methods of the prior art. Further details on this example are provided in Carpenter, Eiger, Gannett, Jackel, Menendez, Shallcross and Von Lehmen, "Impairment-aware Design and Routing for Transparent Optical Networks", in *Technical Proceedings of the National Fiber Optic Engineer's Conference*, pp. 1093-1102, Orlando, Fla., Sep. 7-11, (2003), hereby incorporated by reference.

A second example shows the benefit of various combinations of OEO location methods and routing methods. Three location methods are applied: the method of the present invention that employs domination and connectability graphs; the path-improvement heuristic described in Carpenter et al (OFC 2003); and random selection. Once the OEO-capable nodes are selected in accordance with each of these methods, two different routing algorithms were applied: the impairment-aware routing of the present invention and standard shortest-path routing. The experiments were carried out for two different sets of constraints. The first comprised setting a limit on the number of transparent nodes traversed being less than or equal to 3 and a distance less than or equal to 80 km. The second comprised setting a limit on the number of transparent nodes traversed being less than or equal to 6 and a distance less than or equal to 170 km.

The results of the experiments are shown in Table 1 below. In particular, Table 1 includes the full results of the experiment for all combinations of methods and for both sets of constraints. Further details on this example are provided in Carpenter, Gannett, Jackel, Shallcross and Von Lehmen, "Maximizing the transparency advantage in optical networks", in *Technical Proceedings of the Optical Fiber Communication Conference*, Vol. 2, pp. 616-617, (2003), hereby incorporated by reference.

TABLE 1

Summary of Experiment Results
(CDG connectability & domination graph method;
PIH = path-improvement heuristic)

|  | 3 transparent nodes & 80 km constraints OEOs needed to provide feasible path for each pair | 6 transparent nodes and 170 km constraints OEOs needed to provide feasible path for each pair |
|---|---|---|
| CDG & aware routing | 16 | 7 |
| PIH & aware routing | 36 | 9 |
| PIH & shortest-path routing | 66 | 28 |
| Random and aware routing | 115 | 52 |
| CDG & shortest-path routing | 191 | 119 |

TABLE 1-continued

Summary of Experiment Results
(CDG connectability & domination graph method;
PIH = path-improvement heuristic)

|  | 3 transparent nodes & 80 km constraints OEOs needed to provide feasible path for each pair | 6 transparent nodes and 170 km constraints OEOs needed to provide feasible path for each pair |
|---|---|---|
| Random & shortest-path routing | 162 | 123 |

Clearly, using the methods of the present invention provide the best results. For the first set of constraints, only 16 OEOs are found necessary when using the methods of the present invention (also see FIG. 7a) as compared to 36 found by the path-improvement method and aware routing algorithm (also see FIG. 7b), and 66 found by the path-improvement method and shortest-path routing algorithm. Prior art is best approximated by the path-improvement heuristic with shortest-path routing. Random placement and aware routing required 115 OEOs, while random placement and shortest-path routing required 162 OEOs. The location method of the present invention and shortest-path routing required 191 OEOs.

For the second set of constraints, it was again found that using the methods of the present invention provided the best results, requiring only 7 OEOs, as compared to 9 needed by the path-improvement method and aware routing, and 28 needed by the path-improvement method and shortest-path routing. For this set of constraints, random placement and aware routing required 52 OEOs, while random placement and shortest-path routing required 123 OEOs. The placement method of the present invention and shortest-path routing required 119 OEOs.

In summary, it is shown that feasibility between all pairs of nodes can be assured using remarkably few OEO nodes based on the placement method of the present invention that uses connectability and domination graphs. The superiority of the impairment-aware routing strategy of the present invention is also demonstrated.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A method for locating optical-electrical-optical (OEO) regeneration capability in an optical network having at least one transparent element, said method comprising:
    creating a domination graph for said optical network;
    creating a connectability graph for said optical network;
    identifying a set of nodes that forms a dominating set in said domination graph that remains connected in said connectability graph when all other nodes are removed from said connectivity graph; and
    locating OEO capability at nodes in said optical network corresponding with identified set of nodes.

2. The method according to claim 1, wherein said domination graph and said connectability graph are constructed using information about the network topology of said optical network and in accordance with constraints defining impairment-feasible paths within said optical network.

3. The method for locating optical-electrical-optical (OEO) regeneration capability in an optical network having at least one transparent element, said method comprising:
    creating a domination graph for said optical network;
    creating a connectability graph for said optical network;
    labeling each node in said domination graph with undominated status;
    labeling each node in said connectability graph with unconnected status;
    establishing a list of OEO locations, initially set to empty;
    determining the number of nodes dominated by each node in said domination graph;
    selecting one node that dominates the most nodes;
    performing the following scanning operation on said selected node;
        add said selected node to said OEO list;
        update the labels of the selected node to dominated in said domination graph and connected in said connectability graph;
        update labels for all nodes connected to said selected node to dominated in said domination graph and connected in said connectability graph;
    determine if any undominated nodes still exist and repeat said scanning operation for the connected node that dominates the most undominated nodes;
    repeating said step of determining if any undominated nodes still exist, until no undominated nodes exist; and
    placing OEO capability at each node on the final OEO list.

4. The method according to claim 3, wherein said domination graph and said connectability graph are constructed using information about the network topology of said optical network and in accordance with constraints defining impairment-feasible paths within said optical network.

5. A method for identifying impairment-feasible paths between a first node and a second node in an optical network that contains at least one transparent element, said method comprising:
    selecting at least one measurable parameter related to impairment accumulation along paths in said optical network;
    setting a maximum constraint on said measurable parameter; and
    constructing an impairment graph between said first node and said second node by,
        defining feasible states for said first node, said second node and for each node between said first node and second node by assuring that said maximum constraint is not exceeded;
        representing said first node, said second node and each node between said first and second node by sets of in and out designations for at least one feasible impairment state of each node;
        constructing a directed link from the in designation of an impairment state of a node to the out designation for a new impairment state of the same node if the node may be crossed transparently, where the new impairment state records the change for each measurable parameter related to crossing said node transparently;
        constructing a directed link from the in designation of an impairment state of a node to the out designation for a new impairment state of the same node if regeneration can be performed at the node, where the new impairment state resets each measurable parameter to zero;
        constructing a directed link from the out designation of an impairment state of a node to the in designation for an impairment state of an adjacent node of said optical network, where the impairment state at the in designation records the change for each measurable parameter related to traversing said link;

wherein said impairment graph represents impairment-feasible paths between said first node and said second node.

6. The method according to claim 5, wherein said maximum constraints are set on both total distance and total number of intermediate nodes traversed.

7. The method according to claim 5, wherein said maximum constraints are set on numbers of in-line and node amplifiers traversed.

8. The method according to claim 5, wherein said impairment graph is used to minimize the cost of performing OEO regeneration within the optical network by applying costs to links between in designations and out designations of nodes, where said cost reflects the cost of regenerating at the associated node within said optical network.

9. The method according to claim 5, wherein said impairment graph is used to minimize said measurable parameters by associating costs related to said parameters with links in said impairment graph.

10. The method according to claim 5, further including the steps of identifying a least-cost impairment-feasible path from all of the impairment-feasible paths represented on said impairment graph.

11. The method of claim 10, wherein step of identifying a least-cost impairment-feasible path comprises solving a shortest-path problem.

* * * * *